Feb. 13, 1962 D. F. SAMHAMMER ETAL 3,021,099
UNIVERSAL HYDRAULIC DRILL POSITIONER
Filed Nov. 4, 1958 4 Sheets-Sheet 1
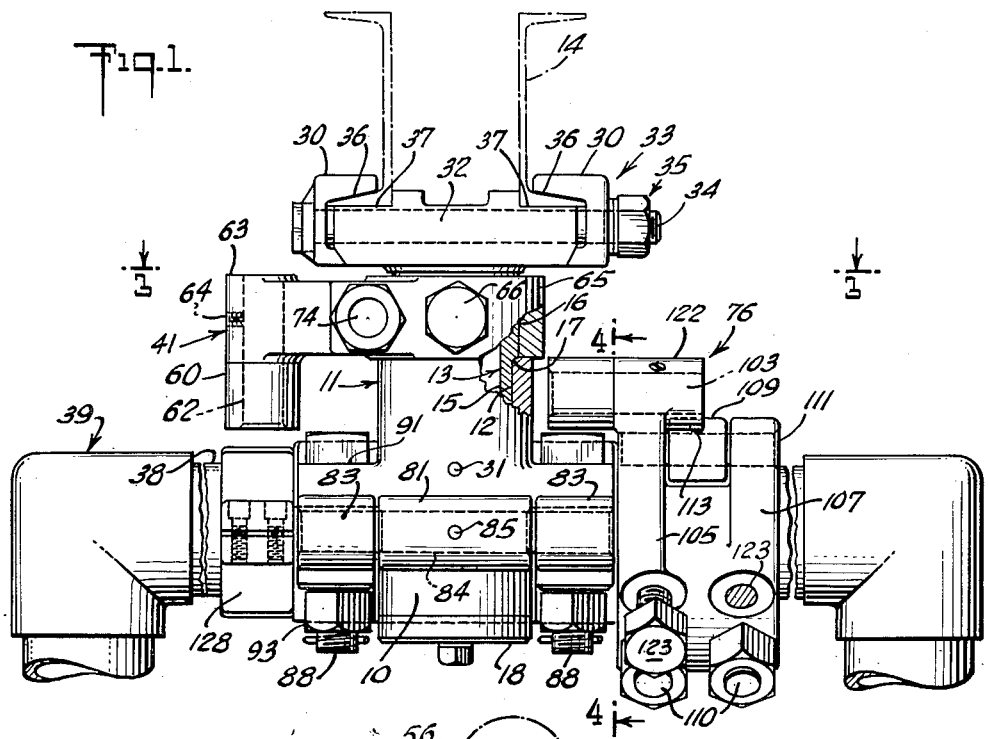
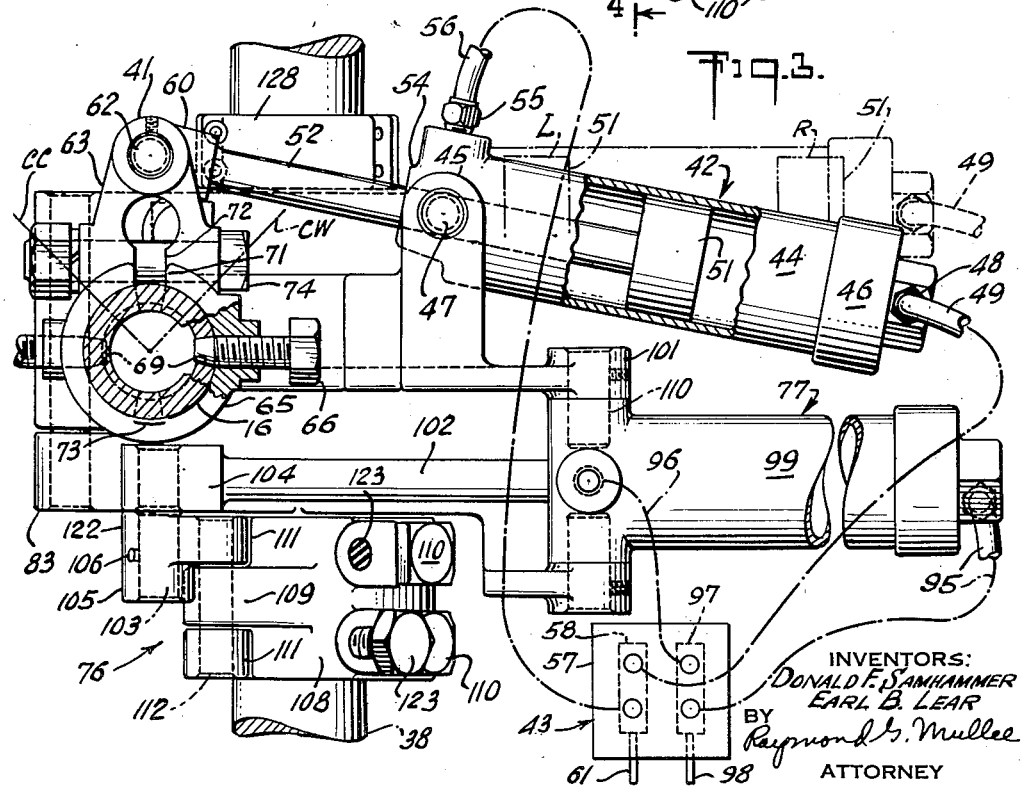
INVENTORS:
DONALD F. SAMHAMMER
EARL B. LEAR
BY Raymond G. Mullee
ATTORNEY

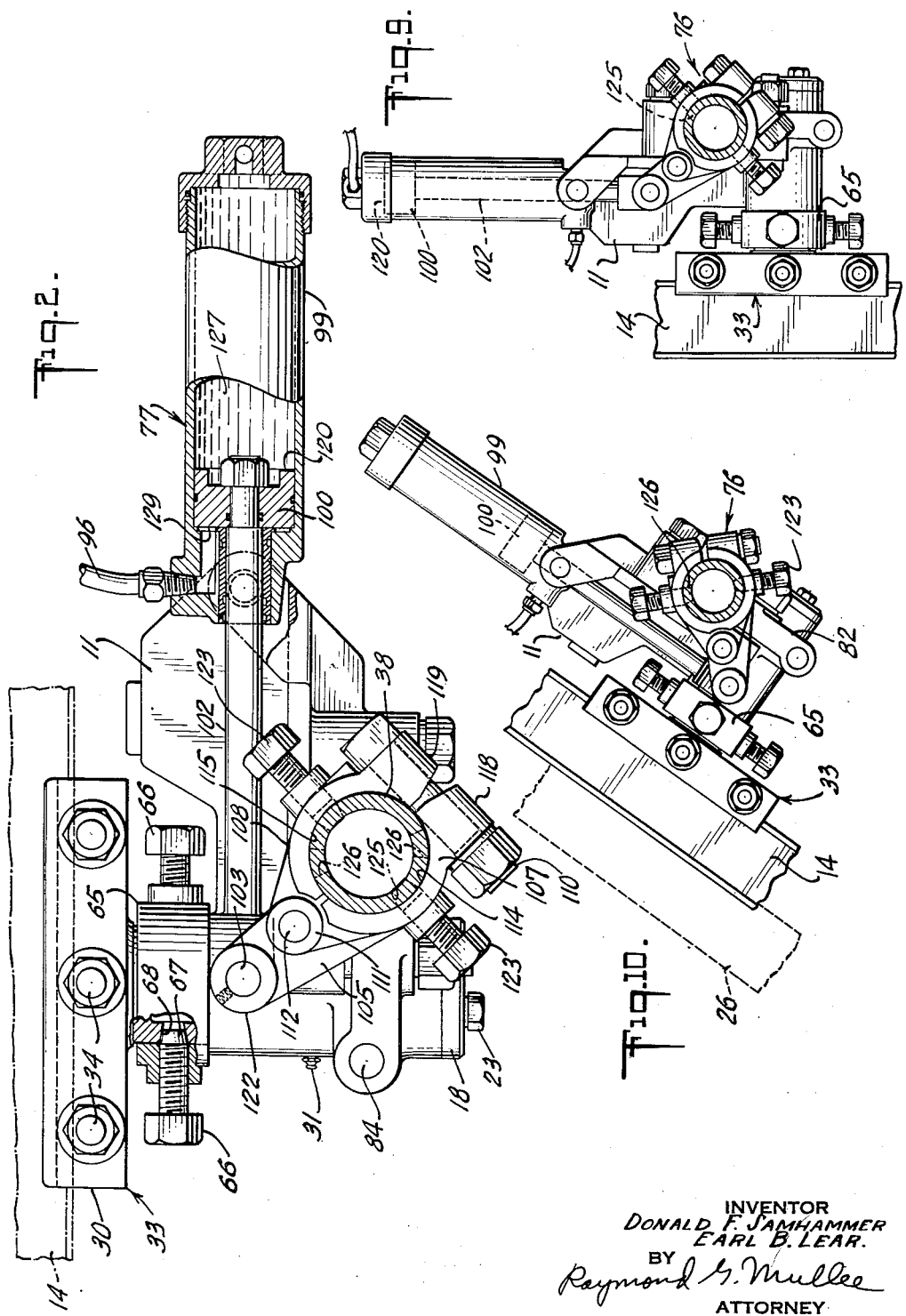

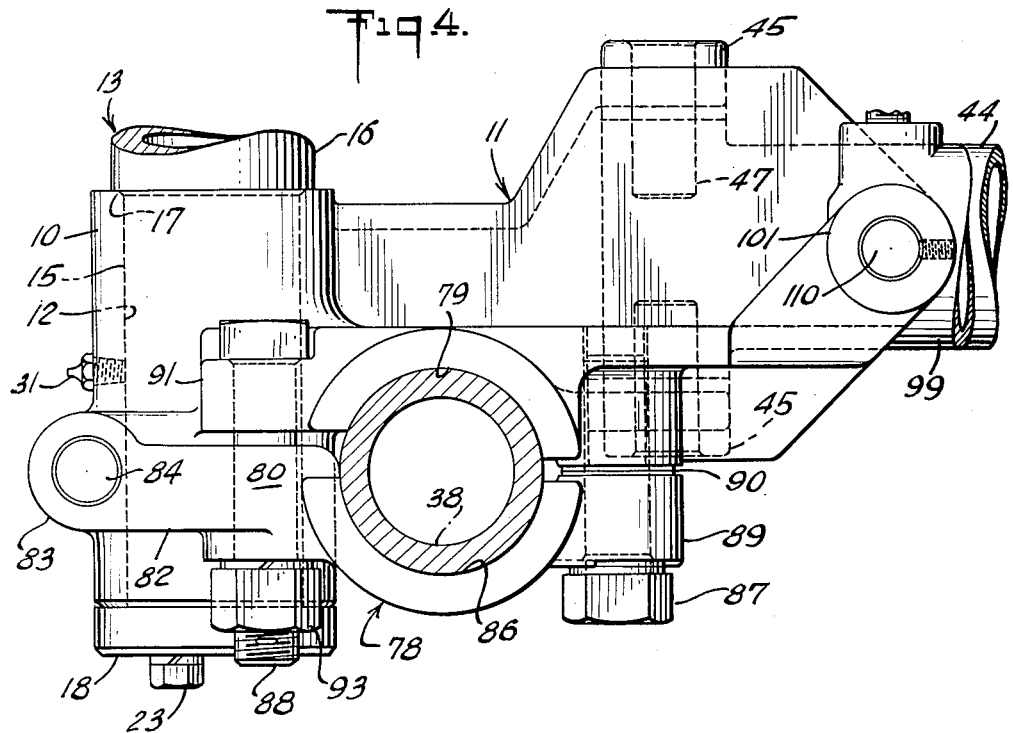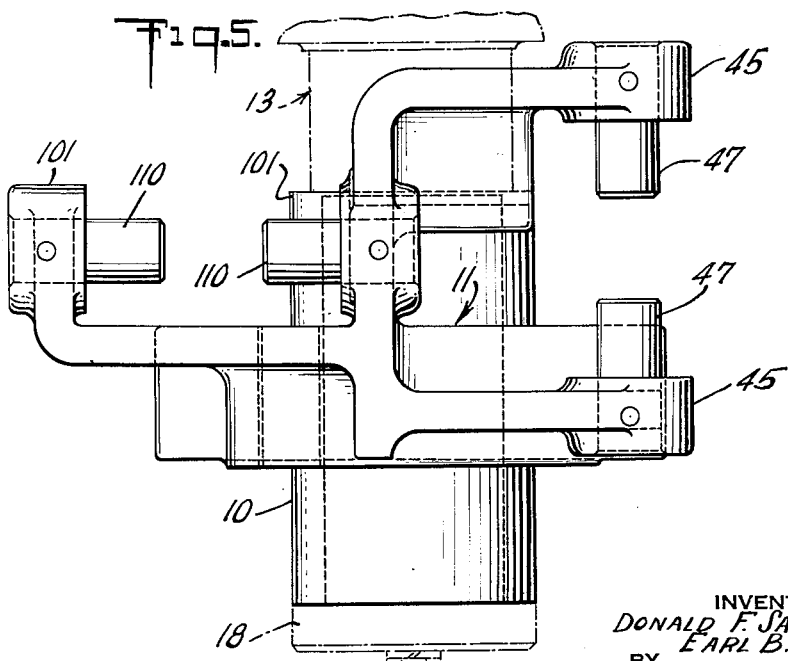

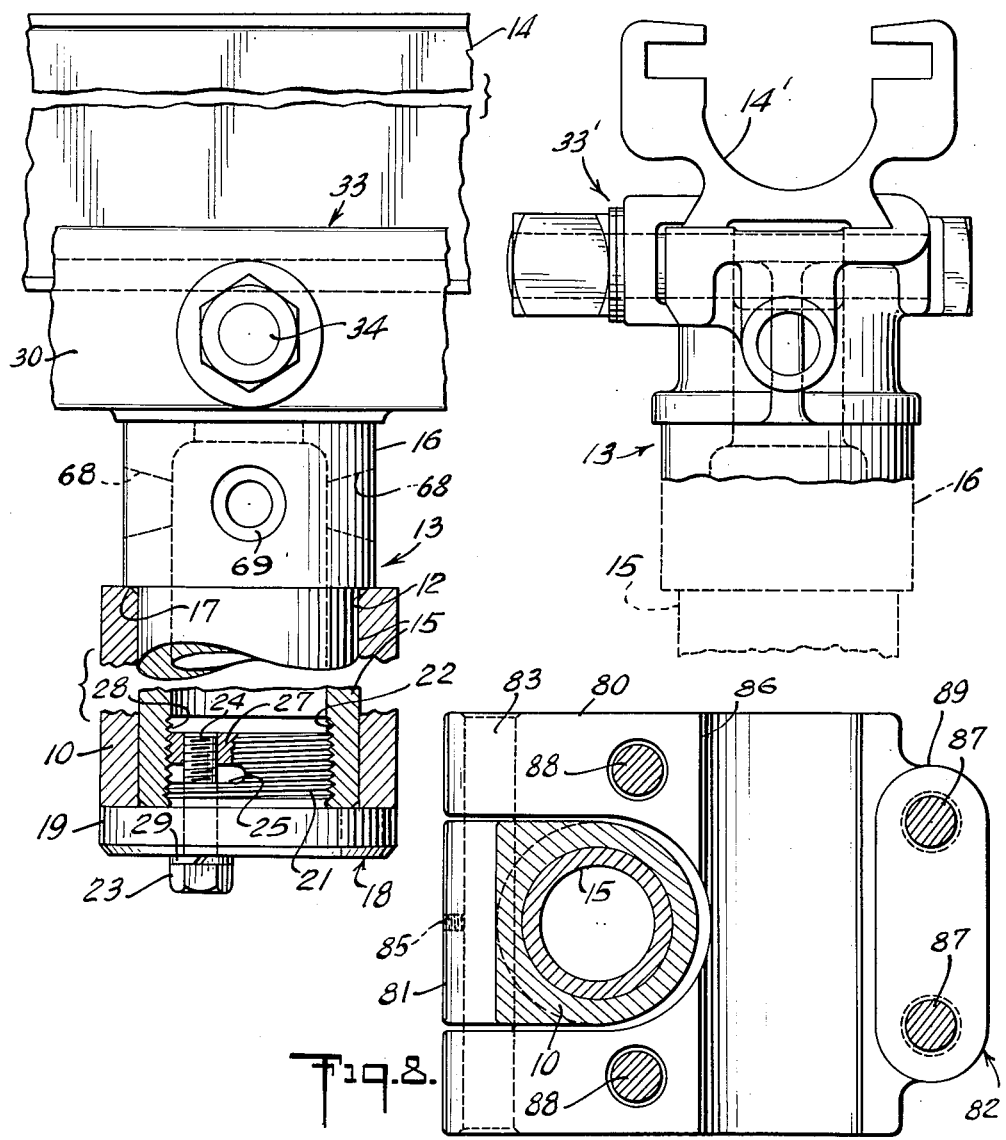

3,021,099
Patented Feb. 13, 1962

3,021,099
UNIVERSAL HYDRAULIC DRILL POSITIONER
Donald F. Samhammer and Earl B. Lear, Utica, N.Y., assignors to Chicago Pneumatic Tool Company, New York, N.Y., a corporation of New Jersey
Filed Nov. 4, 1958, Ser. No. 771,862
14 Claims. (Cl. 248—16)

This invention pertains to a device for supporting and selectively positioning a drill of the type carried upon a slide guide.

A general object of the invention is to provide a device for effecting universal positioning of a drill slide guide and the associated drill thereon.

A further object of the invention is to provide a device which is hydraulically and remotely operable for effecting universal positioning of a drill slide guide about a horizontal axis and about an axis normal to the latter.

A further object of the invention is to provide a common chassis for supporting interchangeable drill slide guide mounting trunnions.

Another object of the invention is to provide a support for a drill slide guide, which is adapted to be removably clamped for pivoting about a fixed shaft.

Another object of the invention is to provide a chassis which is pivotable about a fixed horizontal axis and supports a drill slide guide trunnion mount for rotation about an axis normal to the horizontal axis, together with a pair of fluid powered elements which are interchangeable with one another for effecting pivoting of the support and rotation of the trunnion mount.

A feature of the invention is a supporting structure for a drill slide guide which permits selective positioning of the drill slide guide about a horizontal axis, and about an axis normal to the latter.

Another feature of the invention is hydraulically powered piston means for effecting such positioning of the drill slide guide.

Another feature of the invention is remotely operable control means for operating the hydraulically powered piston means.

A still further feature of the invention is a common casting which is pivotable about a horizontal axis to a selected position; and a trunnion supported in the casting having an axis of rotation normal to the said horizontal axis and supporting a drill slide guide in a plane at right angles to its normal axis.

Another feature of the invention is a common chassis in which interchangeable drill slide guide mounting trunnions may be supported.

A further feature of the invention is a common casting having trunnion means supporting a drill slide guide for rotation about a vertical axis, and having clamp means whereby the casting may be removably pivoted upon a fixed shaft.

A further feature of the invention is a pair of separate hydraulically powered means which may be interchangeably employed, one to swing the trunnion about its normal axis, and the other to dump the chassis about its horizontal axis.

A still further object of the invention is to provide a practical drill positioning device incorporating the various features above and fulfilling the several objects mentioned.

The invention further lies in the particular structure and novel arrangement of its various components, as well as in their cooperative association with one another to effect the results intended herein.

The foregoing and other objects and advantages of this invention will appear more fully hereinafter from a consideration of the detailed description which follows, taken together with the accompanying drawings wherein an embodiment of the invention is illustrated. It is to be expressly understood, however, that the drawings are for purposes of illustration and description, and are not to be construed as defining the limits of the invention.

In the drawings:

FIG. 1 is an elevational view of the left end of a universal hydraulic drill positioner embodying the invention;

FIG. 2 is a side elevational view;

FIG. 3 is a top plan view taken on line 3—3 of FIG. 1;

FIG. 4 is a section taken on line 4—4 of FIG. 1;

FIG. 5 is a right end elevational view of the casting;

FIG. 6 is an elevational view detailing the neck and lower portions of the trunnion;

FIG. 7 is a modified form of the saddle section of the trunnion;

FIG. 8 is a detail of the clamp yoke bar;

FIG. 9 schematically illustrates the position of the chassis dumped 90 degrees counterclockwise from the position in FIG. 2; and FIG. 10 schematically illustrates the position of the chassis when the dump crank has been adjusted counterclockwise relative to the shaft.

In the drawings is shown a universal drill positioner. It includes a casting block or chassis 11 having a cylindrical portion 10 through which a vertical bore 12 opens through the top and bottom surfaces of the chassis. Retained in the bore for rotation about a vertical axis is a trunnion 13 serving to support and position a drill slide guide 14. The trunnion includes an elongated cylindrical lower portion 15 which is borne for rotation in the bore 12 and depends to the bottom of the chassis. Projecting above the top end of the bore is a neck portion 16 of the trunnion having a diameter greater than the bore, whereby an undershoulder 17 is provided which bears upon the top surface of the chassis and thus limits the downward position of the trunnion in the bore. The trunnion is prevented from rising vertically in the bore by a trunnion cap 18 secured to its bottom.

The cap (FIG. 6) has a base plate portion 19, which has a greater diameter than the bottom end of the trunnion and bears against the underside of the part 10 of the chassis as the trunnion is rotated. The cap is secured to the trunnion by means of a threaded boss 21 thereof which is screwed into a threaded recess 22 in the bottom end of the trunnion. The cap is restrained from turning loose relative to the trunnion by lock means. The latter includes a bolt 23 entered up into the boss and having a threaded end portion 24 which crosses a radial slot 25 and is tightly threaded in a hole formed in an upper yieldable portion 27 of the boss. The threads of this portion 27 are drawn downward together with the latter by the tightened bolt 23 into jammed engagement with corresponding threads 28 of recess 22. A lock washer 29 is disposed between the head of the bolt and the trunnion cap. It is clear that the trunnion may be readily disassembled from the chassis or removed vertically from the bore 12 by loosening bolt 23 and unscrewing cap 18 from the trunnion. The corresponding bearing surfaces of the bore 12 and the trunnion portion 15 are lubricated through an associated lube fitting 31 (FIG. 1) in the chassis.

Integral with the top end of the neck 16 of the trunnion is a horizontal crosshead 32 (FIGS. 1 and 6) which forms the base of a mount or saddle clamp 33 for supporting the slide guide 14. A pair of opposed jaws 30 supported along opposite longitudinal sides of the crosshead on cross bolts 34, provide a clamp for rigidly securing the slide guide in position upon the crosshead. Nuts 35 threadable upon external ends of the cross bolts serve to draw the jaws into clamped condition about longitudinal feet or ribs 36 extending laterally from the underside of the slide guide. The ribs 36 are located in parallel tracks 37 of the crosshead 32, whereby the slide guide may be slidably adjusted longitudinally in the saddle before the jaws 30 are tightened.

The slide guide 14 is elongated. It serves both as a support for a conventional drill, such as a rock drill 26 schematically shown in FIG. 10, and as a slide or track over which the drill may be fed and guided toward and away from a work site. Drill slide guides, sometimes called channels or shells, differ in form so as to accommodate the body of the particular drill to be supported thereon. This necessitates minor changes in the saddle clamp section 33 of the trunnion so that the jaws 30 and crosshead 32 of the saddle clamp will accommodate a modified mounting portion of the slide guide. Accordingly, trunnions 13 modified with respect to the saddle clamp, and in other respects the same, are interchangeable with one another in the bore 12 of the chassis. FIG. 7 shows a modified form of drill slide guide 14' carried on a modified saddle clamp section 33' of a trunnion 13, the rest of the trunnion not being shown as it is the same as that detailed in FIG. 6.

The chassis 11 is mounted upon a fixed horizontal cylindrical shaft 38 disposed transversely of its underside. The shaft is here illustrated (FIG. 1) as a fixed or non-rotatable bridge or crosspiece of a U-boom 39 of a rock drill.

A swing crank 41 is associated with the trunnion 13 to effect turning or swinging of the latter on its axis so as to carry the slide guide and the drill carried on the latter to a desired angular position. This crank is powered by hydraulic means 42 which is operable remotely by means of a conventional hydraulic flow control system 43, schematically illustrated in FIG. 3.

The hydraulic means 42 (FIG. 3) includes a piston cylinder 44 which is pivoted upon the chassis so as to swing in a plane that intersects the vertical axis of the trunnion at right angles. In the normal position of the chassis, as in FIGS. 1–3, cylinder 44 swings in a horizontal plane. The cylinder is pivotally mounted at its left end (FIGS. 3, 4, 5) between a pair of vertically spaced ears 45 of the chassis upon a pair of pivot pins 47. A cap or head 46 closing over the outer end of the cylinder has an intake connection 48 with a hose line 49, whereby hydraulic fluid may be fed into the cylinder to drive a piston 51 therein forwardly. A piston rod 52 connected to the piston works through a head 54 closing over the inner end of the cylinder. The latter end has an intake connection 55 with a hose line 56, whereby hydraulic fluid may be fed into the cylinder to drive the piston in a return direction. The hose lines 49 and 56 are connected with a hydraulic fluid distribution device 57 of the hydraulic flow control system 43, in which is incorporated slide valve means 58 remotely operable by a three positional hand lever, not shown, and an associated pull wire 61. In one position of the lever, fluid feed to the cylinder is over the line 49, and return flow is over the line 56. In a second position of the lever, the reverse condition exists; and in a neutral position, flow over both hose lines is blocked, whereby the piston is locked against movement by fluid trapped in the cylinder at the ends of the piston.

The piston rod 52 has a thickened free end 60 pivoted upon a crank pin 62 extending at right angles therefrom. The crank pin projects vertically into an eccentrically located hole of a crank arm or web 63 of the swing crank 41. A set screw 64 restrains the crank pin in the crank arm against endwise movement. The swing crank has a collar main portion 65 which sleeves, and is fixed by suitable means to the neck 16 of the trunnion, whereby actuation of the swing crank turns the trunnion on its axis.

In assembling the trunnion to the chassis, the lower part 15 of the trunnion is entered down through the collar 65 of the swing crank before entering the bore 12 of the chassis, whereby the collar is caused to sleeve the neck 16 of the trunnion. The swing crank is arranged relative to the chassis so that it has a normal position wherein the longitudinal axis of the swing crank is parallel to shaft 38 of the chassis and extends rearwardly of the chassis, as in FIG. 3. A pair of diametrically opposed locating screws 66 in the collar of the swing crank have coned ends 67 which are engageable radially with either of two pairs of complementary locating coned holes 68, 69 positioned 90 degrees apart in the neck 16 of the trunnion (as appears in FIGS. 3 and 6). In adjusting the angular position of the trunnion in the collar, the trunnion is rotated until a selected pair of the holes 68, 69 in the trunnion register with the locating screws 66, whereupon the locating screws are threaded through the collar radially to engage the ends 67 thereof into the registered holes. The position of the trunnion is thereupon fixed to the collar of the swing crank. It is clear that actuation of the piston rod in one direction or the other will swing the trunnion and the associated slide guide accordingly. It is further clear that the trunnion may be adjusted relative to the collar in either of four angular positions 90 degrees apart by means of the two pairs of locating holes 68, 69 and by means of the locating screws 66.

Means is provided to substantially relieve the push and pull load of the piston rod from the locating screws 66 and to spread it evenly over the collar of the swing crank. To this end the collar is split through at 71 along the longitudinal axis of the swing crank substantially into the crank web 63. The split is relatively broad so that the resultant side arms 72 formed in the crank web are relatively narrow and are slightly yieldable or resilient in response to compressive pressure applied to opposite sides thereof. This slight resilience is aided by a shallow recess 73 in the wall of the collar diametrically opposite to the split 71. A bolt 74 passing freely through the arms 72 of the split is tightened by a nut at its opposite end; whereby the arms are drawn yieldably toward one another so that the closely fitting collar grips fast to the neck of the trunnion.

The swing crank, when actuated, is adapted to swing the trunnion on its axis and as a result carry the associated slide guide 14 through an angular distance of 90 degrees in either of the four angularly adjusted positions of the trunnion. It is clear that positioning of the slide guide through 360 degrees is therefore possible by utilizing all four positions of the trunnion. The swing crank is shown in FIG. 3 in its normal position, from which it may be swung 45 degrees in a horizontal plane in either direction. In this normal position of the swing crank, the piston 51 is disposed at about the mid-point of its travelling distance in the cylinder, and an axis line drawn through the centers of the pivot 47 of the piston cylinder and the crank pin 62 is approximately 15 degrees clockwise from an east-west position indicated by the broken line in FIG. 3. When the piston has been fully moved to either its left position L, or its right position R, the crank arm 63 will have been swung 45 degrees counterclockwise or clockwise accordingly, and the cylinder will in each case have pivoted 15 degrees to the broken line position. The broken lines CC and CW indicate the clockwise and counterclockwise positions of the swing crank. In the swinging action the trunnion 13 is turned about its vertical axis, and the slide guide, which is supported in a plane at right angles to the said axis of the trunnion, is carried about by the trunnion in the latter plane.

To obtain further positioning, such as positioning of the slide guide 14 angularly in a vertical plane, the chassis 11 can be pivoted or dumped about its lateral axis, represented by the axis of shaft 38. A dump crank 76 (FIGS. 1–4) is associated with the chassis to effect such dumping action. The dump crank is fixed upon shaft 38 and is powered by hydraulic means 77, also operable remotely by the hydraulic flow control system 43.

The chassis 11 is pivotally mounted upon shaft 38 by clamp means 78 at its underside. An advantage of the clamp means is that it permits assembly and disassembly of the chassis from the shaft in a radial direction without disturbing the latter. The clamp means includes in part the surface of a broad semi-circular bore or cavity 79 formed transversely of the underside of the chassis, which surface is adapted to bear upon shaft 38. Offset from the left end (FIG. 1) of the chassis is a hinge barrel 81 the axis of which is parallel to that of the surface 79 and shaft 38. A broad clamp yoke bar 82 is bifurcated in its left end, as appears in FIG. 8, to provide a pair of laterally spaced yoke arms 80 which extend freely and tangently over opposite areas of the lower part of the cylinder portion 10 of the chassis. Bar 82 has a pair of laterally spaced offset hinge barrels 83 provided at the ends of the yoke arms 80. These are aligned axially with opposite ends of the hinge barrel 81 of the chassis and are hingedly connected to the latter by a pintle 84 inserted in the aligned barrel elements. A set screw 85 in the hinge barrel 81 restrains the pintle against endwise escape. The surface 86 of a semi-circular bore or cavity in the clamp bar 82 opposes and complements the surface 79 of the chassis and bears or seats upon shaft 38. The clamp bar is maintained in bearing relation to the shaft by a pair of bolts 87 at one side of the latter and a second pair 88 at the opposite side. Bolts 87 which pass through holes in an offset end 89 of the clamp bar are tightly threaded in holes in the underside of the cassis. Bolts 88 which pass through offset ears 91 of the chassis and through arms 80 are retained by nuts 93, but the latter are normally loose so as to avoid clamping bar 80 fast to shaft 38. The bearing relation of the opposed semi-circular surfaces 79, 86 of the chassis and the clamp bar upon the shaft 38 is properly adjusted and retained by shims or washers 90 about the bolts 87. If for any reason it is desired that the chassis be temporarily fixed to shaft 38, as when making an adjustment of the drill slide guide, then the bolts 88 and nuts 93 are temporarily tightened for this purpose, and then subsequently loosened again.

The hydraulic means 77 powering the dump crank 76 is similar to and interchangeable with the hydraulic means 42 powering the swing crank 41. It is also similarly controlled through the hydraulic fluid distributor 57 by separate feed and return hose lines 95, 96, and by a separate slide valve 97 and control wire 98.

The piston cylinder 99 of the hydraulic means associated with the dump crank is pivotally mounted on pins 110 between a pair of laterally spaced ears 101 projecting from the right end of the chassis (FIGS. 3, 4, 5), whereby the cylinder pivots in a vertical plane. The latter plane is perpendicular to the plane in which the cylinder 44 of the swing crank pivots. The thickened free end 104 of the piston rod 102 of a piston 100 in the dump crank cylinder turns on a crank pin 103 which extends laterally at right angles into a hole in the crank arm 105 of the dump crank. The crank pin is retained in the crank arm by a set screw 106.

The dump crank is clamped fast upon shaft 38 so that it may be readily assembled upon or removed from the shaft in a radial direction. To this end, it comprises a pair of broad semi-circular clamping members or arms 107, 108 hingedly connected together. An offset laterally extending hinge barrel 109 of arm 108 is received between and aligned with a pair of offset hinge barrels 111 of the arm 107, and a pintle 112 passed through the aligned barrel elements holds them in hinged relation. A set screw 113 in hinge barrel 109 prevents endwise movement of the pintle. A semi-circular bore or cavity 114 in the inner face of arm 107 complements an opposed similar cavity 115 in arm 108. The surfaces of these cavities seat against opposed areas of the shaft when the arms 107, 108 are clamped about the latter. A pair of laterally spaced bolts 110 inserted through registered pairs of holes in offset free ends 118, 119 of the respective arms and tightened by nuts externally threaded on the bolts, cause the arms 107, 108 to clamp or grip the shaft fast. Arm 107 is extended by the crank arm 105 thereof radially beyond one of its hinge barrel elements 111, and carries at its free end an offset barrel 122 providing the hole in which the crank pin 103 is retained.

The dump crank is selectively adjustable to different angular positions on shaft 38. To this end, a set of diametrically opposed locating screws 123 are threadable through bossed portions of the respective arms of the dump crank to locate coned free ends thereof in one or the other of two sets 125, 126 of opposed coned locator holes in shaft 38. The location of screws 123 is made while the clamp bolts 110 are sufficiently loose to permit the dump crank to be adjustably rotated. After location of the screws is accomplished, the clamp bolts 110 are securely tightened, whereby the dump crank is prevented from rotating on the shaft, and also from moving its position in an axial direction.

In FIG. 2, the chassis 11 is held by the located position of the dump crank and by the associated hydraulic means 77 in its normal or horizontal position atop shaft 38. In this position of the chassis, the piston 100 is at the extreme left end of its cylinder 99, and is so held by hydraulic fluid 127 trapped at its rear. The locked condition of piston 100, and the fixed condition of the dump crank on shaft 38 prevents angular movement of the chassis from this normal position until the back pressure of the trapped hydraulic fluid is relieved. The hydraulic means 77 is operable to dump or pivot the chassis counterclockwise from its normal position and to return it clockwise to normal position.

To dump the chassis counterclockwise of the position shown in FIG. 2, hydraulic fluid is applied to the return end 129 of the piston and is relieved from the opposite end, whereupon the chassis 11 dumps or pivots progressively counterclockwise as the piston 100 progressively returns into its cylinder. Counterclockwise movement of the chassis will be limited when the piston has been fully returned, and in this movement the chassis will have pivoted through an arc of 90 degrees from normal horizontal to a vertical position, as indicated schematically in FIG. 9. The chassis may be restored clockwise to normal by directing feed flow of hydraulic fluid to the opposite end 120 of the piston. The chassis may be limited in any intermediate position by trapping the hydraulic fluid in the cylinder at opposite ends of the piston.

The dump crank may be adjusted as in FIG. 10 counterclockwise to a second position wherein the locator screws 123 are located in the second set of locator holes 126 of the shaft. In this adjustment the limited clockwise position of the chassis will appear as in FIG. 10. It is obvious that the dump crank may be selectively adjusted angularly in any one of four angular positions about the cross shaft as determined by the holes 125 and 126.

A collar or stop 128 clamped upon the shaft and bearing against the chassis serves to restrain axial movement of the chassis along the shaft away from the dump crank.

The locating holes 125, 126 are repeated, though not shown, at the opposite end of shaft 38 so that the dump crank and the chassis may be reversed upon the shaft so as to face in the opposite direction, whereby further angular positioning of the chassis and the associated slide guide is enabled.

It is clear that through a combined use of the dump and swing cranks, and by means of the adjustable positions of the trunnion and of the dump crank, the drill slide guide and, as a consequence, a drill thereon can be universally positioned. The drill slide guide may be positioned universally in a horizontal plane, and universally in all angular planes away from horizontal according to the dumped position of the chassis.

While an embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art; and it is our intent, therefore, to claim the invention not only as shown and described but also in all such forms and modifications as may reasonably be construed to fall within the spirit of the invention and the scope of the appended claims.

What is claimed is:

1. A device for effecting angular positioning of a drill slide guide, comprising a non-rotatable horizontal shaft supported in elevated relation to the ground, a block member defining a chassis pivotable through 360 degrees about said shaft, hydraulically powered piston, means individual to the chassis for controlling the pivoting thereof in successive increments of 90 degrees each, a trunnion pivotable on the chassis through 360 degrees about an axis normal to said shaft and carrying externally of the chassis a saddle adapted to support a drill slide guide in a plane at right angles to said normal axis, and hydraulically powered piston means individual to the trunnion for controlling the pivoting thereof about the said axis in successive increments of 90 degrees each.

2. A device for effecting angular positioning of a drill slide guide, comprising in combination with a U-boom having a pair of laterally spaced supporting arms and a non-rotatable shaft bridging the ends of the arms, a casting mounted upon the shaft for rotation around the latter between the arms of the U-boom, the shaft defining a horizontal axis for the casting, a trunnion rotatable in the casting and having an axis of rotation normal to the said horizontal axis, the trunnion integrally carrying externally of the casting a saddle adapted to support a drill slide guide in a plane at right angles to the said normal axis, a dump crank having a mounting portion received upon the shaft and adjustable around the shaft to a plurality of circumferentially spaced selectable positions, releasable fastening means fixing the mounting portion to the shaft in a selected one of said positions, and the dump crank having an arm portion extending from the mounting portion at right angles to the shaft, a first hydraulic cylinder pivoted upon the casting on an axis parallel to the said horizontal axis, a piston hydraulically workable in the cylinder and having a piston rod, a crank pin at the end of the latter having a pivot connection with the outer end of the arm of the dump crank for effecting turning of the casting about the shaft relative to the dump crank upon working of the piston, a swing crank having a mounting portion received upon the trunnion externally of the casting and adjustable around the trunnion to a plurality of circumferentially spaced selectable positions, releasable fastening means fixing the latter mounting portion to the trunnion in a selected one of said positions, and the swing crank having an arm portion extending from the related mounting portion at right angles to the trunnion, a second hydraulic cylinder pivoted upon the casting on an axis parallel to the said normal axis, a piston hydraulically workable in the second cylinder having a piston rod, and a crankpin at the end of the latter having a pivot connection with the outer end of the arm of the swing crank for effecting turning of the trunnion on its normal axis relative to the casting upon working of the piston in the second cylinder.

3. A device as defined in claim 2, wherein the first and second hydraulic cylinders are identical in structure whereby they are interchangeable with one another upon the casting.

4. A device as defined in claim 2, wherein the trunnion has a cylindrical body portion removable disposed in a bore of the casting, and an external neck portion joining the said body portion with the saddle, and the swing crank being removably fixed to the neck portion, whereby trunnions in all respects the same but modified as to the form of the saddle thereon are interchangeable with one another in the bore of the casting, wherein the bore of the casting opens through the bottom end thereof, and a cap removably engaged to the lower end of the trunnion and abutting the casting prevents the trunnion from lifting upwardly out of the bore relative to the casting.

5. A device as defined in claim 2, wherein the trunnion is angularly adjustable relative to the swing crank through 360 degrees to a plurality of predetermined positions.

6. A device as defined in claim 2, wherein the casting is characterized by a detachable clamp at its underside pivotally mounting the casting upon the shaft, whereby the casting together with both hydraulic cylinders thereon may be removed as a unit in a radial direction from the shaft after disengaging the crankpin associated with the dump crank and upon detaching the clamp without disturbing the position of the shaft.

7. In a device of the character described including a chassis block having a trunnion bearing bore opening through opposite surfaces of the chassis block; a trunnion comprising a cylindrical body portion received in the bore for turning in the latter through 360 degrees, a neck of greater diameter than the bore unitary with an upper end of the cylindrical body portion and bearing externally of the bore upon a top surface of the chassis block, the neck being headed by a drill slide guide mount and being adapted for connection with crank means for turning the trunnion in the bore, retainer means detachably associated with a bottom end of the cylindrical body portion of the trunnion preventing lifting of the trunnion out of the bore, and a rigid shaft supported in elevated position; wherein the chassis has a front end and a rear end, and mounting means is provided midway of the ends of the chassis for detachably mounting the chassis upon the shaft in either of two selectable positions for rotation about the shaft, in one of which positions the front end faces in one direction and in the other it faces in the opposite direction, crank means selectively fixable upon one or the opposite ends of the shaft accordingly as the casting faces in one direction or the other, and hydraulically powered piston means mounted upon the chassis and having a pivot pin connection with the crank means for actuating the casting about the rigid shaft.

8. In a device as defined in claim 7, wherein the retainer means comprises a screw cap having a threaded reduced boss portion centrally of one face thereof threadedly engaged in a complementary threaded recess in the bottom end of the cylindrical body portion of the trunnion, and a marginal surface peripherally about the base of the boss of greater diameter than the adjacent end of the bore and bearing against the adjacent surface of the chassis block.

9. In a device of the character described, a cylindrical non-rotatably supported shaft, a chassis block having a semi-circular cavity surface in its underside bearing upon the cylindrical shaft, a bar hingedly connected at one end to the underside of the chassis block having a semi-circular cavity surface complementing that of the chassis block and seated upon an opposite surface area of the shaft, fastening elements removably securing the free end of the bar to the chassis block, means for maintaining the opposed semi-circular surfaces in uniform bearing relation to the shaft, a crank fixed selectively to one end or the opposite end of the shaft adjacent a specific side of the chassis according to the direction the chassis is caused to face when seated upon the shaft, and a hydraulically powered piston means including a cylinder pivotally supported upon the chassis on an axis parallel to that of the shaft and including a piston rod hydraulicaly workable in and out of the cylinder and having a pivot pin connection with the crank.

10. In combination, a U-boom having a pair of supporting arms and a non-rotatable horizontal shaft fixed transversely of the outer ends of the arms, a casting rotatably mounted upon the shaft between the arms and adapted to support a drill slide guide the axis of rotation of the casting upon the shaft being midway of a forward end and a rear end of the casting, a crank arm releasably fixed to the shaft at right angles, the crank arm being adjustable, when released, around the shaft to a plurality of circumferentially spaced selectable positions and having releasable fastening means for securing it in any one of said selectable positions, a hydraulic cylinder having a head end pivoted to the casting on an axis parallel to the shaft and in spaced relation thereto, a piston hydraulically reciprocable in the cylinder, a piston rod extending from the piston through the head end of the cylinder and having a crank pin connection at its free end with the crank arm for effecting turning of the casting upon the shaft relative to the crank arm upon working of the piston in the cylinder, and means for hydraulically locking the piston in any selected position in the cylinder.

11. In combination, a non-rotatable shaft, a casting detachably mounted upon the shaft for rotation about the latter, the casting having an elongated body and the axis of rotation thereof upon the shaft being substantially midway of opposite ends of the body means supported by the casting for mounting a drill slide guide, a crank arm releasably fixed to the shaft at right angles, a hydraulic cylinder having a head end pivoted to the casting on an axis parallel to the shaft and in spaced relation thereto, a piston hydraulically reciprocable in the cylinder, a piston rod extending from the piston through the head end of the cylinder and having a crank pin connection at its free end with the crank arm, the piston having a normal position limited at the head end of the cylinder wherein the casting has a predetermined normal position upon the shaft, and the piston having an opposite end position in the cylinder wherein the casting is angularly removed 90 degrees from the said normal position, means for hydraulically moving the piston to and locking it in either position, the crank arm being adjustable, when released, around the shaft to a plurality of selectable positions each spaced 90 degrees circumferentially from the other, and the crank arm having releasable fastening means for securing it fast in any one of said selectable positions.

12. An arrangement for hydraulically positioning a drill assembly through 360 degrees, comprising a fixed support, trunnion means swivelled upon the support for rotation relative to the latter through 360 degrees and adapted to carry a drill assembly, hydraulic piston powered crank means for swivelling the trunnion through an angle of predetermined degree upon a cycle of operation of its piston, the latter means including a crank mounted to the trunnion, a hydraulic piston cylinder pivoted upon the support, and a piston hydraulically workable in and out of the cylinder having a free end pivoted to the crank; and means enabling manual relocation of the said crank about the trunnion to a selected one of a plurality of positions each spaced angularly a predetermined degree from the other.

13. An arrangement for hydraulically positioning a drill assembly through 360 degrees, comprising a fixed support, trunnion means swivelled upon the support for rotation relative to the latter through 360 degrees and adapted to carry a drill assembly, hydraulic piston powered crank means for swivelling the trunnion through an angle of 90 degrees upon a cycle of operation of its piston, the latter means including a crank mounted to the trunnion, a hydraulic piston cylinder pivoted upon the support having a pivot axis parallel to that of the trunnion and having an operating pivot range of fifteen degrees about its pivot, and a piston hydraulically workable in and out of the cylinder having a free end pivoted to the crank; and means enabling after each cycle of operation of the piston manual relocation of the said crank about the trunnion to a distance 90 degrees removed from its then particular location.

14. An arrangement for hydraulically positioning a drill assembly through 360 degrees in increments of 90 degrees about a horizontal axis and for positioning the drill assembly through 360 degrees in increments of 90 degrees about an axis normal to the horizontal axis, comprising a horizontal non-rotatable shaft supported in elevated relation to the ground, a chassis mounted upon the shaft for rotation thereon through 360 degrees, a crank received upon the shaft adjacent to the chassis and extending from the shaft at right angles, the crank being selectively positionable circumferentially about the shaft in any of four positions each spaced 90 degrees apart, fastening means carried by the crank for releasably fixing the crank to the shaft in any selected one of said positions, a hydraulically powered piston means having a cylinder pivoted upon the chassis on an axis parallel to that of the shaft, a piston rod hydraulically extensible from and retractable into the cylinder, and a crank pin pivotally engaging the outer end of the piston rod with the crank; the chassis having an initial position when the piston rod is fully extended and having a position angularly moved from its initial position a distance of 90 degrees when the piston rod is fully retracted; a bore in the chassis; a trunnion swiveled in the bore for turning in the latter through 360 degrees about an axis normal to the horizontal axis of the shaft, the trunnion having a neck portion externally of the bore above the chassis headed by a drill assembly; a swing crank received upon the neck portion and extending therefrom at right angles, the swing crank being selectively positionable circumferentially about the neck in any of four positions each spaced 90 degrees apart; fastening means carried by the crank for releasably fixing the crank to the trunnion in any selected one of said positions; a hydraulically powered piston means having a swing cylinder pivoted upon the chassis on an axis parallel to the axis of the trunnion, a piston rod hydraulically extensible from and retractable into the swing cylinder, and a crank pin pivotally engaging the outer end of the latter piston rod with the swing crank, the trunnion having an initial position when the related piston rod is fully retracted in the swing cylinder, and the trunnion having a position 90 degrees removed when the related piston rod is fully extended from the swing cylinder.

References Cited in the file of this patent

UNITED STATES PATENTS

| | | |
|---|---|---|
| 1,509,022 | Noble | Sept. 16, 1924 |
| 2,559,711 | Dansereau | July 10, 1951 |
| 2,598,112 | Curtis | May 27, 1952 |